US011223993B2

(12) United States Patent
Basu Mallick et al.

(10) Patent No.: US 11,223,993 B2
(45) Date of Patent: Jan. 11, 2022

(54) V2X COMMUNICATION RESOURCE FOR MOBILITY EVENT

(71) Applicant: Lenovo (Singapore) PTE. LTD., New Tech Park (SG)

(72) Inventors: Prateek Basu Mallick, Dreieich (DE); Karthikeyan Ganesan, Kaiserslautern (DE); Joachim Loehr, Wiesbaden (DE); Ravi Kuchibhotla, Clarendon Hills (IL)

(73) Assignee: Lenovo (Singapore) PTE. LTD., New Tech Park (SG)

( * ) Notice: Subject to any disclaimer, the term of this patent is extended or adjusted under 35 U.S.C. 154(b) by 106 days.

(21) Appl. No.: 16/825,178

(22) Filed: Mar. 20, 2020

(65) Prior Publication Data

US 2020/0305055 A1    Sep. 24, 2020

Related U.S. Application Data

(60) Provisional application No. 62/821,306, filed on Mar. 20, 2019.

(51) Int. Cl.
*H04W 4/00* (2018.01)
*H04W 36/32* (2009.01)
(Continued)

(52) U.S. Cl.
CPC .............. *H04W 36/32* (2013.01); *H04W 4/40* (2018.02); *H04W 12/06* (2013.01); *H04W 36/08* (2013.01); *H04W 72/02* (2013.01); *H04W 76/27* (2018.02)

(58) Field of Classification Search
CPC ....... H04W 36/32; H04W 4/40; H04W 76/27; H04W 12/06; H04W 36/08; H04W 72/02; H04W 36/0072
(Continued)

(56) References Cited

U.S. PATENT DOCUMENTS 10,772,107 B2 * 9/2020 Lee ..................... H04W 72/10
10,820,245 B2 * 10/2020 Hahn ................. H04W 36/0016
(Continued)

FOREIGN PATENT DOCUMENTS

EP            2395791 A2      12/2011

OTHER PUBLICATIONS

3GPP, "3rd Generation Partnership Project; Technical Specification Group Radio Access Network; Evolved Universal Terrestrial Radio Access (E-UTRA) and NR; Multi-connectivity; Stage 2 (Release 15)", 3GPP TS 37.340 V15.4.0, Dec. 2018, pp. 1-67.
(Continued)

*Primary Examiner* — Amancio Gonzalez
(74) *Attorney, Agent, or Firm* — Kunzler Bean & Adamson

(57) ABSTRACT

Apparatuses, methods, and systems are disclosed for mobility handling during Vehicle-to-Everything ("V2X") communication. One apparatus includes a processor and a transceiver that communicates using a first V2X resource while in a first serving cell having a first radio access technology. The processor a processor detects a mobility event of the first cell and switches to a second cell in response to the mobility event, the second cell different than the first cell. The processor communicates using the first V2X resource on the second cell until a trigger condition occurs and switches to a second V2X resource in response to occurrence of the trigger condition.

20 Claims, 9 Drawing Sheets

(51) Int. Cl.
*H04W 4/40* (2018.01)
*H04W 76/27* (2018.01)
*H04W 12/06* (2021.01)
*H04W 36/08* (2009.01)
*H04W 72/02* (2009.01)

(58) Field of Classification Search
USPC .......................................................... 370/331
See application file for complete search history.

(56) References Cited

U.S. PATENT DOCUMENTS

| | | | | |
|---|---|---|---|---|
| 10,980,036 | B2* | 4/2021 | Lu | H04W 36/06 |
| 2019/0229964 | A1* | 7/2019 | Ouchi | H04L 27/2613 |
| 2019/0306835 | A1* | 10/2019 | Hoang | H04W 72/082 |
| 2020/0196279 | A1* | 6/2020 | Thomas | H04W 72/02 |
| 2021/0105789 | A1* | 4/2021 | Freda | H04W 72/087 |

OTHER PUBLICATIONS

3GPP, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 15)", Dec. 2018, pp. 1-363.

3GPP, "3rd Generation Partnership Project; Technical Specification Group Radio Access Network; NR; NR and NG-RAN Overall Description; Stage 2 (Release 15)", 3GPP TS 38.300 V15.4 0, Dec. 2018, pp. 1-97.

3GPP, "3rd Generation Partnership Project; Technical Specification Group Radio Access Network; Evolved Universal Terrestrial Radio Access (E-UTRA); Radio Resource Control (RRC); Protocol specification (Release 15)", 3GPP TS 36.331 V15.4.0, Dec. 2018, pp. 1-933.

3GPP, "3rd Generation Partnership Project; Technical Specification Group Radio Access Network; NR; Radio Resource Control (RRC) protocol specification (Release 15)", 3GPP TS 38.331 V15.4.0, Dec. 2018, pp. 1-474.

PCT/IB2020/000138, "Notification of Transmittal of the International Search Report and the Written Opinion of the International Searching Authority, or the Declaration", PCT ISA, dated Jun. 30, 2020, pp. 1-15.

Qualcomm Incorporated, "Co-existence aspects for NR-V2X and LTE-V2X", 3GPP TSG RAN WG1 Meeting #94bis R1-1811268, Oct. 8-12, 2018, pp. 1-4.

Zte, Sanechips, "Consideration on multiple mode NR V2X resource allocation", 3GPP TSG RAN WG2 Meeting #105 R2-1900381, Feb. 25-Mar. 1, 2019, pp. 1-4.

Nokia, Nokia Shanghai Bell, "Cross-RAT V2X support", 3GPP TSG-RAN WG2 Meeting #104 R2-1817684, Nov. 12-16, 2018, pp. 1-2.

Huawei (rapporteur), "Summary of [103bis#37][NR/V2X]—NR sidelink design, CP aspects", GPP TSG-RAN WG2 Meeting #104 R2-1816515, Nov. 12-16, 2018, pp. 1-46.

* cited by examiner

V2X COMMUNICATION RESOURCE FOR MOBILITY EVENT

CROSS-REFERENCE TO RELATED APPLICATIONS

This application claims priority to U.S. Provisional Patent Application No. 62/821,306 entitled "Efficient Mobility Handling During V2X Communication" and filed on Mar. 20, 2019 for Prateek Basu Mallick, Karthikeyan Ganesan, Joachim Loehr and Ravi Kuchibhotla, which application is incorporated herein by reference.

FIELD

The subject matter disclosed herein relates generally to wireless communications and more particularly relates to efficient mobility handling during V2X communication.

BACKGROUND

The following abbreviations are herewith defined, at least some of which are referred to within the following description: Third Generation Partnership Project ("3GPP"), Fifth Generation Core Network ("5CG"), Fifth Generation System ("5GS"), Authentication, Authorization and Accounting ("AAA"), Access and Mobility Management Function ("AMF"), Positive-Acknowledgment ("ACK"), Application Programming Interface ("API"), Access Stratum ("AS"), Base Station ("BS"), Control Element ("CE"), Connection Mode ("CM", this is a NAS state in 5GS), Core Network ("CN"), Control Plane ("CP"), Downlink Control Information ("DCI"), Downlink ("DL"), Discontinuous Transmission ("DTX"), Evolved Node-B ("eNB"), Evolved Packet Core ("EPC"), Evolved Packet System ("EPS"), EPS Mobility Management ("EMM", this is a NAS state in EPS), Frequency Division Duplex ("FDD"), Frequency Division Multiple Access ("FDMA"), General Packet Radio Service ("GPRS"), Global System for Mobile Communications ("GSM"), Hybrid Automatic Repeat Request ("HARQ"), Home Subscriber Server ("HSS"), Home Public Land Mobile Network ("HPLMN"), Information Element ("IE"), Long Term Evolution ("LTE"), Multiple Access ("MA"), Mobility Management ("MM"), Mobility Management Entity ("MME"), Negative-Acknowledgment ("NACK") or ("NAK"), New Generation (5G) Node-B ("gNB"), New Generation Radio Access Network ("NG-RAN", a RAN used for 5GS networks), New Radio ("NR", a 5G radio access technology; also referred to as "5G NR"), Non-Access Stratum ("NAS"), Network Exposure Function ("NEF"), Network Slice Selection Assistance Information ("NSSAI"), Packet Data Unit ("PDU", used in connection with 'PDU Session'), Physical Broadcast Channel ("PBCH"), Physical Cell Identity ("PCI"), Physical Downlink Control Channel ("PDCCH"), Physical Downlink Shared Channel ("PDSCH"), Pattern Division Multiple Access ("PDMA"), Physical Hybrid ARQ Indicator Channel ("PHICH"), Physical Random Access Channel ("PRACH"), Physical Resource Block ("PRB"), Physical Uplink Control Channel ("PUCCH"), Physical Uplink Shared Channel ("PUSCH"), Public Land Mobile Network ("PLMN"), Radio Access Network ("RAN"), Radio Access Technology ("RAT"), Radio Resource Control ("RRC"), Random-Access Channel ("RACH"), Registration Area ("RA", similar to tacking area list used in LTE/EPC), Registration Management ("RM", refers to NAS layer procedures and states), Receive ("RX"), Radio Link Control ("RLC"), Shared Channel ("SCH"), Session Management ("SM"), Session Management Function ("SMF"), Sidelink ("SL"), Single Network Slice Selection Assistance Information ("S-NSSAI"), System Information Block ("SIB"), Synchronization Signal ("SS"), Tracking Area ("TA"), Transport Block ("TB"), Transport Block Size ("TBS"), Time-Division Duplex ("TDD"), Time Division Multiplex ("TDM"), Transmit ("TX"), Unified Data Management ("UDM"), User Data Repository ("UDR"), Uplink Control Information ("UCI"), User Entity/Equipment (Mobile Terminal) ("UE"), Uplink ("UL"), User Plane ("UP"), Universal Mobile Telecommunications System ("UMTS"), Visited Public Land Mobile Network ("VPLMN"), and Worldwide Interoperability for Microwave Access ("WiMAX"). As used herein, "HARQ-ACK" may represent collectively the Positive Acknowledge ("ACK") and the Negative Acknowledge ("NACK") and Discontinuous Transmission ("DTX"). ACK means that a TB is correctly received while NACK (or NAK) means a TB is erroneously received. DTX means that no TB was detected.

In certain wireless communication systems, V2X communication allows vehicles to communicate with moving parts of the traffic system around them. A UE capable of NR and LTE communication may be provided V2X communication resources for network scheduled V2X communication for both NR and LTE RATs (i.e. Mode-1 resources in NR SL and Mode-3 resources in LTE SL) as well as V2X communication resources for UE scheduled V2X communication for both the RATs (i.e. Mode-2 resources in NR SL and Mode-4 resources in LTE SL).

In LTE V2X communication, the resources provided for Mode-3 and Mode-4 V2X communication by the serving cell are not used anymore when a mobility event occurs, such as reception of handover command/T304 start, or RLF triggering/T310 start. Here, an "exceptional" resource pool is used for Mode-4 based communication. However, it is unclear what happens to V2X communication resources for the one RAT (e.g., RAT-2) when a mobility event in the other, serving RAT (e.g., RAT-1).

BRIEF SUMMARY

Disclosed are procedures for efficient mobility handling during V2X communication. One method of a UE, e.g., for mobility handling during V2X communication, includes communicating using a first V2X resource while in a first serving cell having a first RAT, detecting a mobility event of the first cell and switching to a second cell in response to the mobility event, the second cell different than the first cell. The method includes communicating using the first V2X resource on the second cell until a trigger condition occurs and switching to a second V2X resource in response to occurrence of the trigger condition.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
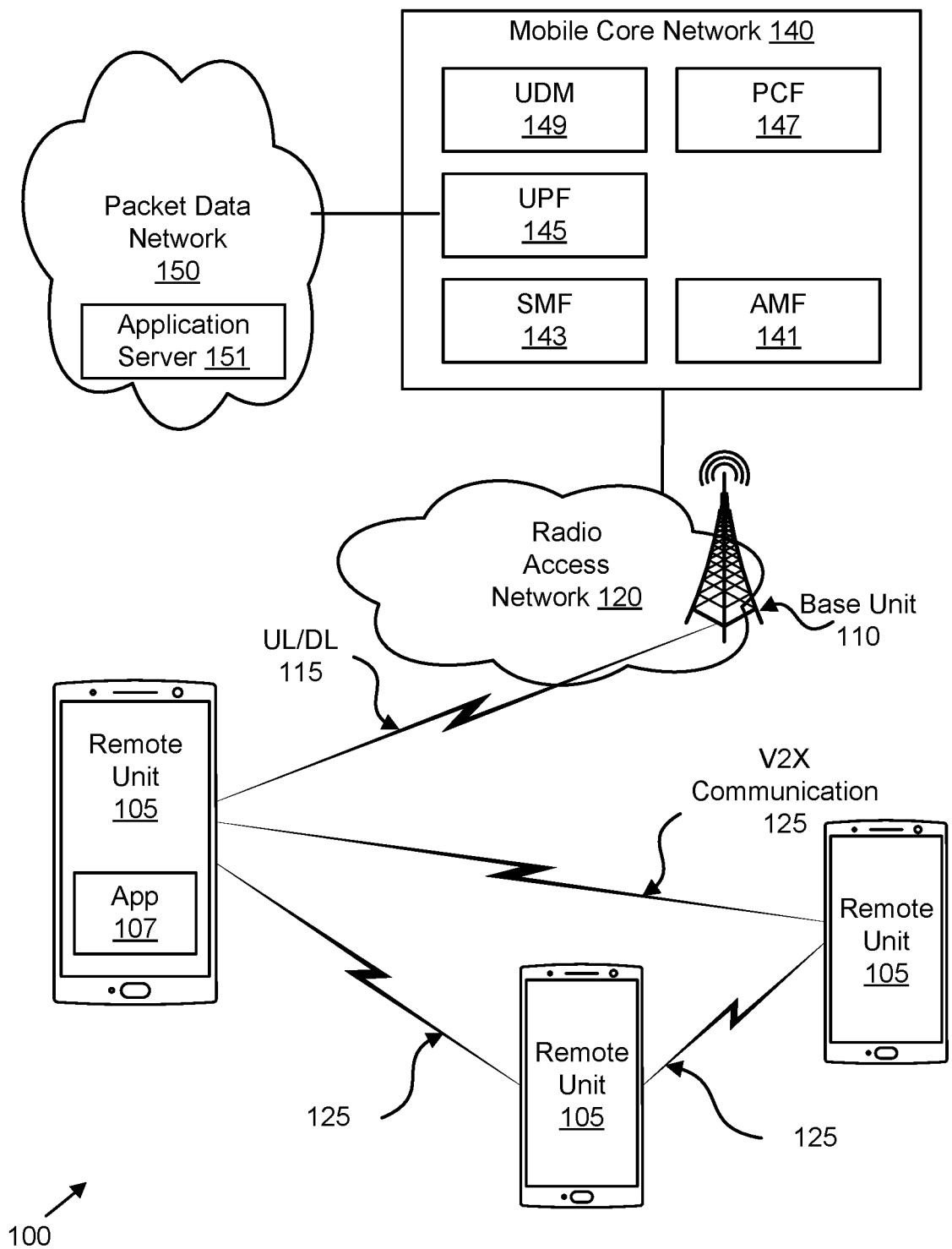
FIG. 1 is a schematic block diagram illustrating one embodiment of a wireless communication system for efficient mobility handling during V2X communication.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects.

For example, the disclosed embodiments may be implemented as a hardware circuit comprising custom very-large-scale integration ("VLSI") circuits or gate arrays, off-the-shelf semiconductors such as logic chips, transistors, or other discrete components. The disclosed embodiments may also be implemented in programmable hardware devices such as field programmable gate arrays, programmable array logic, programmable logic devices, or the like. As another example, the disclosed embodiments may include one or more physical or logical blocks of executable code which may, for instance, be organized as an object, procedure, or function.

Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random-access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain or store a program for use by or in connection with an instruction execution system, apparatus, or device.

Code for carrying out operations for embodiments may be any number of lines and may be written in any combination of one or more programming languages including an object-oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

As used herein, a list with a conjunction of "and/or" includes any single item in the list or a combination of items in the list. For example, a list of A, B and/or C includes only A, only B, only C, a combination of A and B, a combination of B and C, a combination of A and C or a combination of A, B and C. As used herein, a list using the terminology "one or more of" includes any single item in the list or a combination of items in the list. For example, one or more of A, B and C includes only A, only B, only C, a combination of A and B, a combination of B and C, a combination of A and C or a combination of A, B and C. As used herein, a list using the terminology "one of" includes one and only one of any single item in the list. For example, "one of A, B and C" includes only A, only B or only C and excludes combinations of A, B and C. As used herein, "a member selected from the group consisting of A, B, and C," includes one and only one of A, B, or C, and excludes combinations of A, B, and C." As used herein, "a member selected from the group consisting of A, B, and C and combinations thereof" includes only A, only B, only C, a combination of A and B, a combination of B and C, a combination of A and C or a combination of A, B and C.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart diagrams and/or block diagrams.

The code may also be stored in a storage device that can direct a computer, other programmable data processing apparatus, or other devices to function in a particular manner, such that the instructions stored in the storage device produce an article of manufacture including instructions which implement the function/act specified in the flowchart diagrams and/or block diagrams.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart diagrams and/or block diagrams.

The flowchart diagrams and/or block diagrams in the Figures illustrate the architecture, functionality, and operation of possible implementations of apparatuses, systems, methods, and program products according to various embodiments. In this regard, each block in the flowchart diagrams and/or block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

Generally, the present disclosure describes systems, methods, and apparatus for efficient mobility handling during V2X communication for UEs engaged in V2X communication. V2X communication, i.e., "Vehicle-to-Everything" communication may include one or more of: "V2I" (vehicle-to-infrastructure) communication, "V2N" (vehicle-to-network) communication, "V2V" (vehicle-to-vehicle) communication, "V2P" (vehicle-to-pedestrian) communication, "V2D" (vehicle-to-device) communication and "V2G" (vehicle-to-grid) communication. A V2X UE is a UE capable of vehicular communication using 3GPP protocol(s).

In some scenarios, the serving RAT (referred to as 'RAT-1') can also provide resources for V2X communication for another RAT (referred to as 'RAT-2') in addition to providing resources for V2X communication in the serving RAT. In one embodiment, RAT-1 corresponds to 3GPP LTE and RAT-2 corresponds to 3GPP NR. In another embodiment, RAT-2 corresponds to 3GPP LTE and RAT-1 corresponds to 3GPP NR.

In a general scenario, the remote unit 105 may be provided V2X communication resources for network scheduled V2X communication for both RATs (i.e., Mode-1 resources in NR SL and Mode-3 resources in LTE SL) as well as V2X communication resources for UE-scheduled V2X communication for both the RATs (i.e., Mode-2 resources in NR SL and Mode-4 resources in LTE SL).

There are some mobility events like cell reselection, cell handover, radio link failure, or similar. One example handover is called "RRC_ConnectionReconfiguration with MobilityControlInfo" described in 3GPP TS 36.331. "Exceptional condition" in TS 36.331 pertains to such mobility events. In LTE V2X communication, the resources provided for Mode-3 and Mode-4 V2X communication by the serving cell are not used anymore when one of the mobility events occurs (like reception of handover command/T304 start, or RLF triggering/T310 start); rather, a "exceptional" resource pool is used for Mode-4 based communication. However, UE behavior for the V2X communication resources for the other RAT ('RAT-2') when a mobility event occurs in the serving RAT ('RAT-1') is currently undefined.

In addition, if no cross-RAT provisioning of V2X communication resources is available (i.e., cell from RAT-1 providing V2X communication resources for RAT-2) and the V2X UE must (also) perform V2X message transmission on RAT-2, this behavior is also unclear and currently undefined. In various implementations, 5.9 GHz spectrum may neither be universally available nor available in sufficient quantity to support NR V2X advanced use cases. Note that two-RAT broadcasting may be used by upper layers for important V2X safety messages (like Basic Safety Messages). Various use cases for advanced V2X services have been identified and they are categorized into four use case groups: 1) vehicles platooning, 2) extended sensors, 3) advanced driving and 4) remote driving.

FIG. 1 depicts a wireless communication system 100 for efficient mobility handling during V2X communication for wireless devices communicating V2X messages 125, according to embodiments of the disclosure. In one embodiment, the wireless communication system 100 includes at least one remote unit 105, a radio access network ("RAN") 120, and a mobile core network 140. The RAN 120 and the mobile core network 140 form a mobile communication network. The RAN 120 may be composed of a base unit 110 with which the remote unit 105 communicates using wireless communication links 115. Even though a specific number of remote units 105, base units 110, wireless communication links 115, RANs 120, and mobile core networks 140 are depicted in FIG. 1, one of skill in the art will recognize that any number of remote units 105, base units 110, wireless communication links 115, RANs 120, and mobile core networks 140 may be included in the wireless communication system 100.

In one implementation, the wireless communication system 100 is compliant with the 5G system specified in the 3GPP specifications. More generally, however, the wireless communication system 100 may implement some other open or proprietary communication network, for example, LTE or WiMAX, among other networks. The present disclosure is not intended to be limited to the implementation of any particular wireless communication system architecture or protocol.

In one embodiment, the remote units 105 may include computing devices, such as desktop computers, laptop computers, personal digital assistants ("PDAs"), tablet computers, smart phones, smart televisions (e.g., televisions connected to the Internet), smart appliances (e.g., appliances connected to the Internet), set-top boxes, game consoles, security systems (including security cameras), vehicle on-board computers, network devices (e.g., routers, switches, modems), or the like. In some embodiments, the remote units 105 include wearable devices, such as smart watches, fitness bands, optical head-mounted displays, or the like. Moreover, the remote units 105 may be referred to as the UEs, subscriber units, mobiles, mobile stations, users, terminals, mobile terminals, fixed terminals, subscriber stations, user terminals, wireless transmit/receive unit ("WTRU"), a device, or by other terminology used in the art.

The remote units 105 may communicate directly with one or more of the base units 110 in the RAN 120 via uplink ("UL") and downlink ("DL") communication signals. Furthermore, the UL and DL communication signals may be carried over the wireless communication links 115. Here, the RAN 120 is an intermediate network that provides the remote units 105 with access to the mobile core network 140.

In some embodiments, the remote units 105 communicate with an application server 151 via a network connection with the mobile core network 140. For example, an application 107 (e.g., web browser, media client, telephone/VoIP application) in a remote unit 105 may trigger the remote unit 105 to establish a PDU session (or other data connection) with the mobile core network 140 via the RAN 120. The mobile core network 140 then relays traffic between the remote unit 105 and the application server 151 in the packet data network 150 using the PDU session. Note that the remote unit 105 may establish one or more PDU sessions (or other data connections) with the mobile core network 140. As such, the remote unit 105 may concurrently have at least one PDU session for communicating with the packet data network 150 and at least one PDU session for communicating with another data network (not shown).

The base units 110 may be distributed over a geographic region. In certain embodiments, a base unit 110 may also be referred to as an access terminal, an access point, a base, a base station, a Node-B, an eNB, a gNB, a Home Node-B, a relay node, or by any other terminology used in the art. The base units 110 are generally part of a radio access network ("RAN"), such as the RAN 120, that may include one or more controllers communicably coupled to one or more corresponding base units 110. These and other elements of radio access network are not illustrated but are well known generally by those having ordinary skill in the art. The base units 110 connect to the mobile core network 140 via the RAN 120.

The base units 110 may serve a number of remote units 105 within a serving area, for example, a cell or a cell sector, via a wireless communication link 115. The base units 110 may communicate directly with one or more of the remote units 105 via communication signals. Generally, the base units 110 transmit DL communication signals to serve the remote units 105 in the time, frequency, and/or spatial domain. Furthermore, the DL communication signals may be carried over the wireless communication links 115. The wireless communication links 115 may be any suitable carrier in licensed or unlicensed radio spectrum. The wireless communication links 115 facilitate communication between one or more of the remote units 105 and/or one or more of the base units 110.

In one embodiment, the mobile core network 140 is a 5G core ("5GC") or the evolved packet core ("EPC"), which may be coupled to a packet data network 150, like the Internet and private data networks, among other data networks. A remote unit 105 may have a subscription or other account with the mobile core network 140. Each mobile core network 140 belongs to a single public land mobile network ("PLMN"). The present disclosure is not intended to be limited to the implementation of any particular wireless communication system architecture or protocol.

The mobile core network 140 includes several network functions ("NFs"). As depicted, the mobile core network 140 includes multiple user plane functions ("UPFs") 141. The mobile core network 140 also includes multiple control plane functions including, but not limited to, an Access and Mobility Management Function ("AMF") 143 that serves the RAN 120, a Session Management Function ("SMF") 145, and a Policy Control Function ("PCF") 147. In certain embodiments, the mobile core network 140 may also include an Authentication Server Function ("AUSF"), a Unified Data Management function ("UDM") 149, a Network Repository Function ("NRF") (used by the various NFs to discover and communicate with each other over APIs), or other NFs defined for the 5GC.

Although specific numbers and types of network functions are depicted in FIG. 1, one of skill in the art will recognize that any number and type of network functions may be included in the mobile core network 140. Moreover, where the mobile core network 140 is an EPC, the depicted network functions may be replaced with appropriate EPC entities, such as an MME, S-GW, P-GW, HSS, and the like. In certain embodiments, the mobile core network 140 may include a AAA server.

In various embodiments, the mobile core network 140 supports different types of mobile data connections and different types of network slices, wherein each mobile data connection utilizes a specific network slice. Here, a "network slice" refers to a portion of the mobile core network 140 optimized for a certain traffic type or communication service. A network instance may be identified by a S-NSSAI, while a set of network slices for which the remote unit 105 is authorized to use is identified by NSSAI. In certain embodiments, the various network slices may include separate instances of network functions, such as the SMF 145 and UPF 141. In some embodiments, the different network slices may share some common network functions, such as the AMF 143. The different network slices are not shown in FIG. 1 for ease of illustration, but their support is assumed.

While FIG. 1 depicts components of a 5G RAN and a 5G core network, the described embodiments for efficient mobility handling during V2X communication apply to other types of communication networks and RATs, including IEEE 802.11 variants, GSM, GPRS, UMTS, LTE variants, CDMA 2000, Bluetooth, ZigBee, Sigfoxx, and the like. For example, in an LTE variant involving an EPC, the AMF 143 may be mapped to an MME, the SMF 145 mapped to a control plane portion of a PGW and/or to an MME, the UPF 141 map to an SGW and a user plane portion of the PGW, the UDM/UDR 149 maps to an HSS, etc.

In various embodiments, the remote units 105 may communicate directly with each other (e.g., device-to-device communication) using V2X communication signals 125. Here, V2X transmissions may occur on V2X resources. As discussed above, a remote unit 105 may be provided with different V2X communication resources for different V2X modes. Mode-1 corresponds to a NR network-scheduled V2X communication mode. Mode-2 corresponds to an LTE network-scheduled V2X communication mode. Mode-3 corresponds to a NR UE-scheduled V2X communication mode. Mode-4 corresponds to an LTE UE-scheduled V2X communication mode.

According to a first solution, a remote unit 105 continues to use the same V2X resources (in either or both RATs, if the RAT changed as a result of the mobility procedure) after the mobility event occurs. The remote unit 105 continues to use these resources until a discontinuation condition (i.e., trigger condition) occurs.

According to a second solution, a source RAT authenticates V2X communication in the non-serving target RAT and/or in the non-serving target frequency. Here, the source RAT (e.g., RAN 120) explicitly allow (or disallow) the V2X remote unit 105 to perform V2X communication in RAT-2 (or in a frequency-2 of RAT-1) while the remote unit 105 is in the coverage of this serving cell.

According to a third solution, a source RAT explicitly signals the V2X remote unit 105 allowing the remote unit 105 to read and use the Mode-2/Mode-4 resource pool from broadcast signaling in a neighbor cell from RAT-1 or RAT-2. Allowance is by way of specification or network configuration.

According to a fourth solution, the V2X remote unit 105 uses a common, pre-configured (and/or specified) communication resource for transmission and reception on each RAT. Here, the communication resource may be a frequency and/or a resource pool. Use of common, pre-configured V2X resources is discussed in further detail below with reference to FIG. 3.

According to a fifth solution, the V2X remote unit 105 stores RAT specific V2X communication resources and uses these stored resources in a cross-RAT situation where no cross-RAT V2X resources are provided by the serving RAT. Again, the communication resource may be a frequency and/or a resource pool. Use of stored V2X resources is discussed in further detail below with reference to FIGS. 4 and 5.

According to a sixth solution, the V2X remote unit 105 uses common (or separate) 'exceptional' resource pools on the non-serving RAT when a mobility event occurs on the serving RAT. Use of exceptional V2X resources is discussed in further detail below with reference to FIG. 6.

According to a seventh solution, the V2X remote unit 105 senses free resource Pool(s) for one or both of the RATs, for re-transmissions as well as for new transmissions, once the mobility event kicks in. For re-transmissions, the transmitter V2X remote unit 105 continues to use the same source L2 ID and HARQ process ID as used in the initial transmission before the mobility event. A receiver V2X remote unit 105 uses these two information for soft combining in a particular HARQ buffer.

According to an eighth solution, the exceptional resources are defined to be the "pre-configured frequency and/or resource Pool" for each RAT—thus obviating the need for any signaling, as described in further detail below with reference to the fourth solution. Note that if a serving cell provides Exceptional resources for one or both RAT(s) dedicatedly (e.g., via dedicated signaling), then the remote unit 105 may be explicitly signaled if the same is valid in the current RAN Validity Area.

Figure 2:
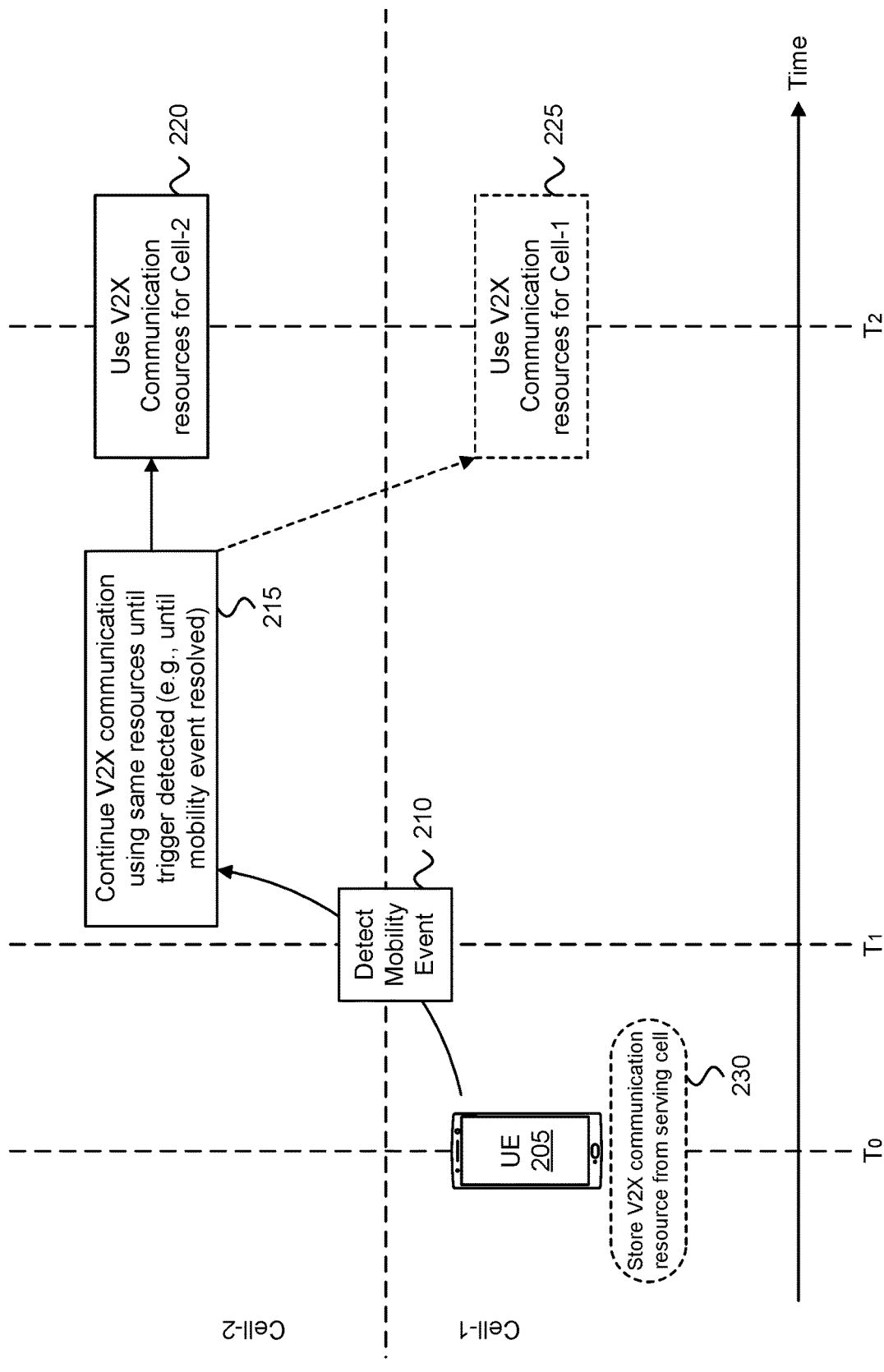
FIG. 2 is a diagram illustrating UE mobility during V2X communication.

FIG. 2 depicts a first scenario 200 of V2X mobility handling, according to embodiments of the disclosure. The first scenario 200 involves a UE 205 configured for V2X communication. At time '$T_0$', the UE 205 is in Cell-1 and uses V2X resources configured for Cell-1. Note that the UE 205 may optionally store information about V2X communication resources received from the serving cell (Cell-1) as discussed below (see 230). At time '$T_1$', the UE 205 experiences a mobility event (see 210). The mobility event may include, but is not limited to, handover from a source cell (or source RAT) to a target cell (or target RAT), Radio Link Failure ("RLF"), RRC Re-establishment, and transitioning from IDLE to CONNECTED RRC state (or vice versa).

The UE 205 continues to use the same V2X resources (in either or both RATs) after the mobility event occurs and until a trigger condition is detected, e.g., until the mobility event is resolved (see 215). At time '$T_2$', the UE 205 detects the trigger condition and switched to use V2X communication resources for Cell-2 (see 220). Note that in certain situations, the mobility event may be resolved by the UE 205 returning to or re-stablishing connection with Cell-1. In such embodiments, the UE 205 may use V2X communication resources for Cell-1 (see 225).

According to the first solution, UE 205 continues to use the previously configured resources (rather than Exceptional Resource pool as discussed below) until a discontinuation condition (i.e., trigger condition) occurs. In various embodiments, the UE 205 continues to use the same resources (as in use for V2X communication in either/both RATs at the time of mobility event) until one or more of the following occur:

In one embodiment, the trigger condition is detecting that the mobility situation is over. For example, the UE 205 may have re-established the RRC Connection in a target cell. In another example, the UE 205 may have sent a Handover Complete message to the target cell. In another example, the UE 205 may have successfully transitioned to RRC Connected state.

In one embodiment, the trigger condition is determining that the target cell has provided (or declined to provide) V2X resources using RRC signaling. For example, if the UE 205 moved from Cell-1 to Cell-2, the UE 205 continues to use V2X resources configured for Cell-1 until a new configuration is received from Cell-2.

In one embodiment, the trigger condition is expiration of a timer configured by the source RAT. After expiry of the timer, the UE 205 may fallback to one of the other behaviors described herein for continuing V2X communication (e.g., solutions #4-8).

In one embodiment, the trigger condition is the UE 205 continuing to find any suitable source cell, i.e., the UE 205 has not entered an out-of-coverage state. Note that after detecting the out-of-coverage condition, the UE 205 may then use pre-configured Mode-2/Mode-4 resources. Alternatively, the network may configure the UE 205 to perform a different one of the behaviors discussed herein until the discontinuation condition occurs.

According to the second solution, a source RAT (i.e., RAT-1) authenticates V2X communication in the non-serving RAT. As used herein, 'RAT-1' refers to the serving RAT of the UE 205 while the UE 205 is in RRC Idle, RRC Inactive or in RRC Connected state. Here, the source RAT (e.g., RAN as well as CN) explicitly allow (or disallow) the V2X UE 205 to perform V2X communication in RAT-2 while the UE 205 is in the coverage of this serving cell. Recall that 'RAT-2' refers to the other RAT where the Upper layers would like to send a V2X message. Note that cross-RAT authentication may depend on UE credentials (USIM, subscription) of the UE 205. In one embodiment, the RAN node (e.g., gNB) uses a one-bit flag to signal whether the UE 205 is allowed to perform V2X communication in the non-serving RAT.

In some embodiments, the Access and Mobility subscription data of a UE may be modified to add a new field (i.e., 'Cross-RAT PC5 type') to indicate whether LTE Uu controls LTE and/or NR sidelink from the cellular network, and whether NR Uu controls LTE and/or NR sidelink from the cellular network. Here, the field 'Cross-RAT PC5 type' is obtained by the AMF from the UDM as a part of the subscription data during the registration procedure and stores it as a part of the UE context. This information is included in the NGAP message from AMF to NG-RAN, which it uses for the resource management of UE's PC5 transmission for V2X services in network scheduled mode.

If cross-RAT PC5 control authorization indication information is to be changed, the AMF 143 is to notify NG-RAN via the NGAP UE Context Modification Request message. In one embodiment, the RAN indication (i.e., Cross-RAT PC5 control authorization indication) is applicable for unicast mode V2X transmission. Accordingly, the UE 205 may receive a signal from the RAN 120 that it is allowed to perform cross-RAT V2X communications.

According to the third solution, the source RAT (i.e., RAT-1) explicitly signals the V2X UE 205 allowing the UE 205 to read and use the Mode-2/Mode-4 resource pool from broadcast signaling in a neighbor cell from a RAT-2. Allowance is by way of specification or network configuration. Accordingly, the RAT-1 allows the UE 205 to read RAT-2 info, and simultaneously allows UE to use the configured resource pool in RAT-2.

Figure 3:
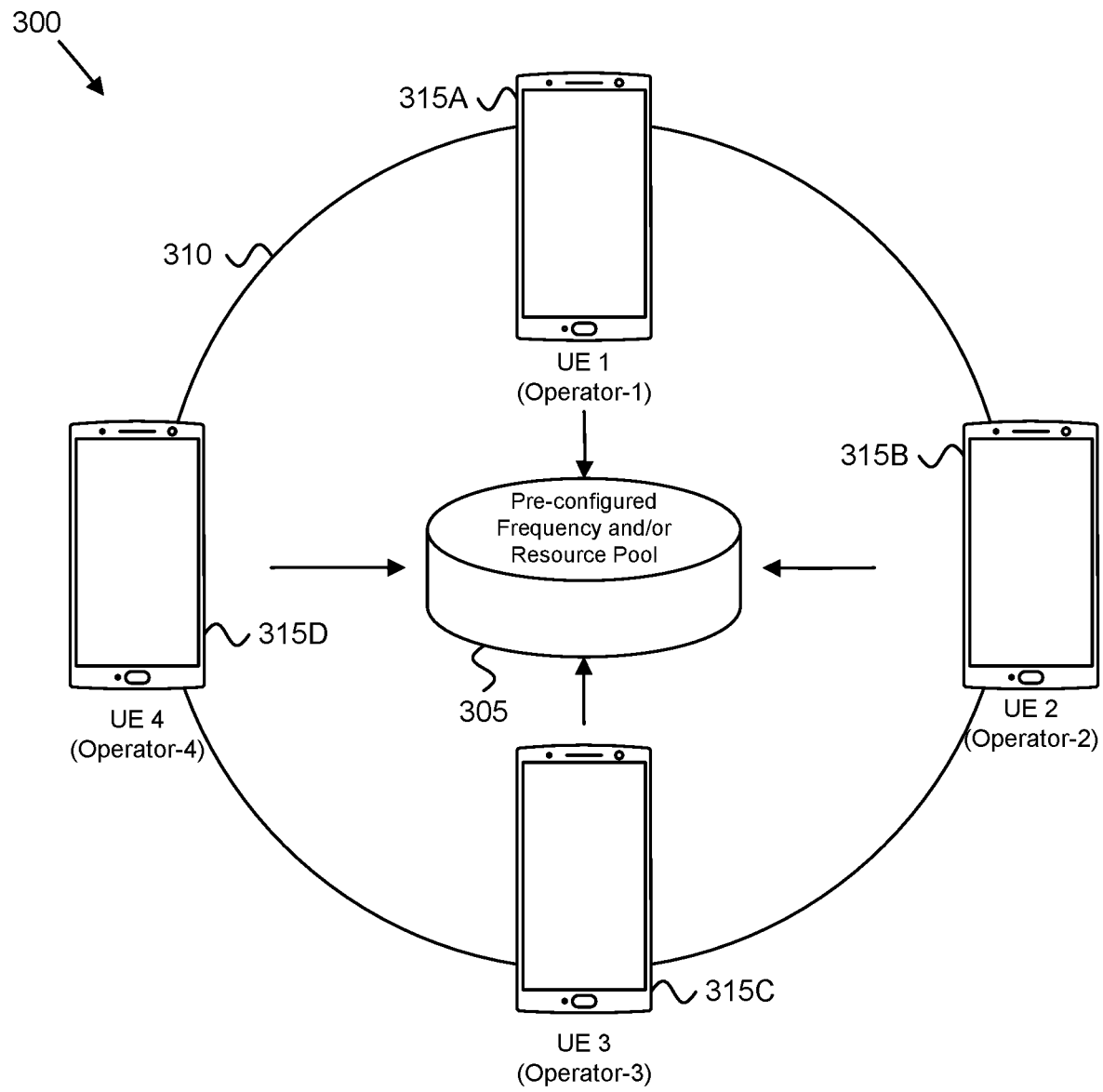
FIG. 3 is a diagram illustrating one embodiment of pre-provisioned resources for V2X communication.

FIG. 3 depicts a second scenario 300 of V2X mobility handling, according to embodiments of the disclosure. The scenario 300 has resource pool 305 and a plurality of V2X UEs in a geographical area 310. While FIG. 3 depicts a first UE (UE-1) 315A, a second UE (UE-2) 315B, a third UE (UE-3) 315C, and a fourth UE (UE-4) 315D, the scenario 300 may include any number of V2X UEs 315. According to the fourth solution, when not provided V2X Communication resources by the serving cell, all UEs use the same pre-provisioned resources for V2X communication.

The scenario 300 involves one or more V2X UEs 315 using of a common pre-configured and/or specified V2X communication resource (e.g., frequency and/or resource Pool) 305 for transmission and reception on each RAT. The pre-configured and/or specified V2X communication resource may be used by any V2X UE 315 in a geographical area 310 irrespective of its operator (USIM provider).

If the serving cell from RAT-1 does not provide V2X communication resources for V2X communication in RAT-2, a V2X UE 315 uses a pre-configured frequency and/or resource Pool for transmission and reception on RAT2. The said "pre-configured frequency and/or resource Pool" is defined for each RAT. For example, separate frequency/resource pools may be pre-configured for NR as well as LTE.

For example, an NR V2X UE is to use the pre-configured LTE frequency and/or resource Pool for performing V2X Communication when required by upper layers; whereas, a LTE V2X UE is to use the pre-configured NR frequency and/or resource Pool for performing V2X Communication when required by upper layers when the serving cell from one RAT does not provide V2X communication resources for V2X communication in the other RAT. Here, the term "NR V2X UE" refers to a V2X UE where the active protocol stack is NR (e.g., the source RAT is NR). Similarly, the term "LTE V2X UE" refers to a V2X UE where the active protocol stack is LTE (e.g., the source RAT is LTE).

The pre-configured and/or specified V2X communication resource may be pre-provisioned in the UE 305 e.g. based on regional regulation, frequency availability; or, may be specified or, configurable in a RAN/TA area (e.g., geographical area 310).

Figure 4:
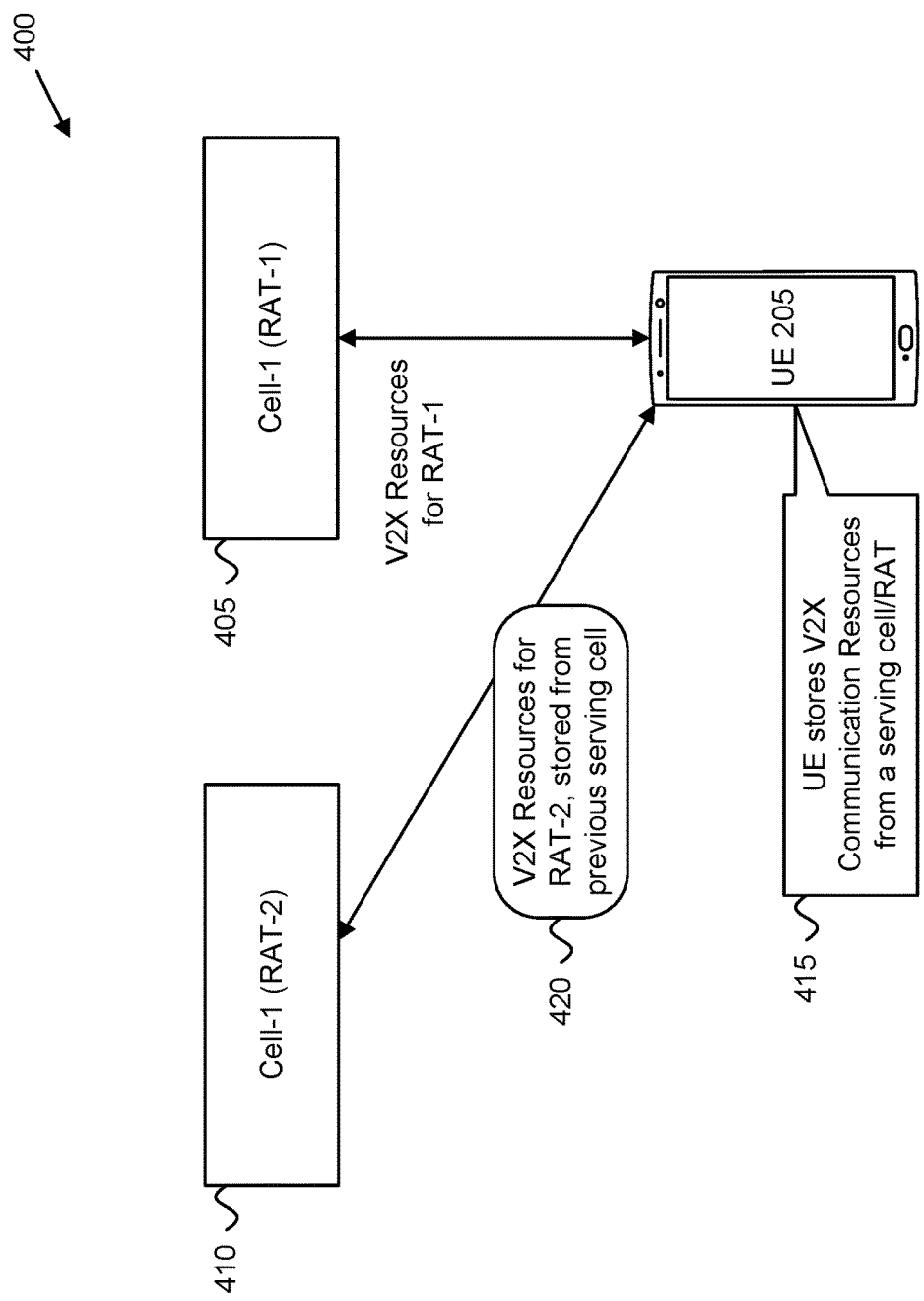
FIG. 4 is a diagram illustrating one embodiment of a UE that stores V2X communication resources from a serving cell-RAT.

FIG. 4 depicts a third scenario 400 of V2X mobility handling, according to embodiments of the disclosure. The scenario 400 involves a V2X UE 205 storing RAT-specific V2X communication resources and using stored V2X resources in cross-RAT situation when no cross-RAT V2X resources are provided by the serving RAT. FIG. 4 depicts one aspect of the fifth solution.

Here, Cell-1 supports both RAT-1 405 (the serving RAT) and RAT-2 410. The UE 205 may receive V2X resources 415 for RAT-2 in a previous serving cell (e.g., Cell-0). The UE 205 stores these V2X communication resources. Upon moving to Cell-1, the UE 205 is not provided Cell-1 RAT-2 V2X communication resources. Because Cell-1/RAT-1 405 does not provide cross-RAT resources (i.e., RAT-2 410 resources), the UE 205 uses the previous stored V2X resources stored for RAT-2. Unlike the fourth solution, in the third scenario 400 (showing the fifth solution) the UE 205 uses the previously stored V2X communication resources, e.g., those provided by Cell-0 (see 420).

Figure 5:
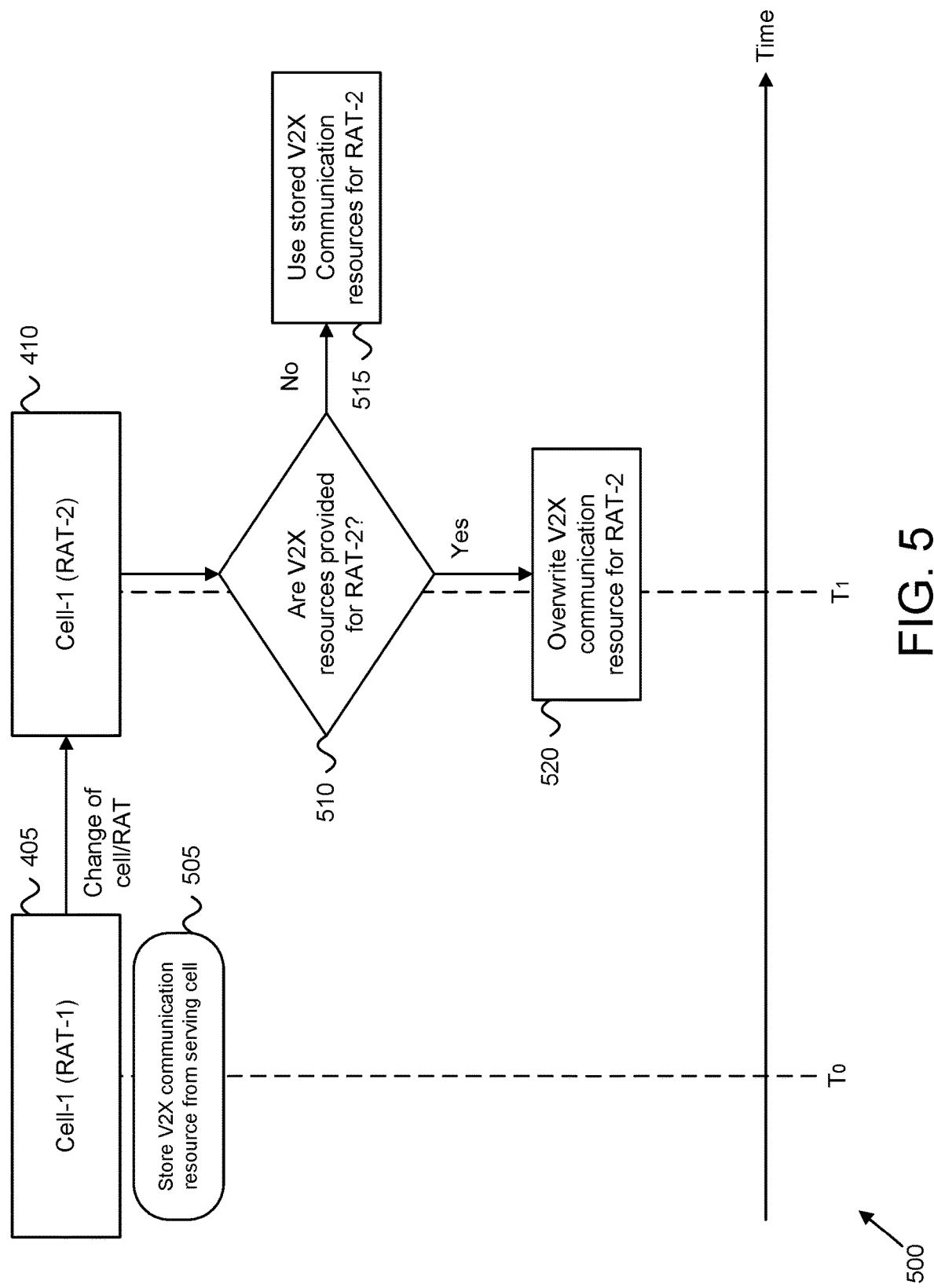
FIG. 5 is a diagram illustrating one embodiment of a UE using stored V2X communication resources.

FIG. 5 depicts a fourth scenario 500 of V2X mobility handling, according to embodiments of the disclosure. The scenario 500 may be performed by a UE, such as the V2X UE 205. As discussed in greater detail, the UE uses stored V2X Communication resources for RAT-2, if such resources are not provided by the serving cell. FIG. 5 is representative of a second aspect of the fifth solution, and an extension to the scenario 400.

Again, Cell-1 supports both RAT-1 405 (the serving RAT) and RAT-2 410. At time 'T$_0$' the Cell-1/RAT-1 405 is the serving cell for the UE. The UE 205 stores V2X communication resources for RAT-2 received in a previous serving cell (e.g., Cell-0, see 505). However, due to UE mobility, the UE 205 experiences a change of cell and/or RAT. Upon moving to Cell-1/RAT-2 410 (e.g., at time 'T$_1$'), the UE 205 is not provided Cell-1 RAT-2 V2X communication resources.

As depicted, if the UE 205 does not get V2X resources for RAT-2 from the serving RAT (Cell-1/RAT-1), it uses the stored V2X resources for RAT-2 (Cell-1/RAT-2), if the same can be considered valid (see 515). The UE 205 stores V2X resources for a RAT (e.g., resource Pool(s) and/or frequency) when it receives them from a cell of that RAT. However, these resources may be overwritten by (i.e., replaced with) the new resources received from the next serving cell while the UE 205 is in RRC Idle (broadcast signaling) or in RRC Connected (RRC dedicated signaling) state (see 520).

The validity of V2X resources for a RAT may marked by validity time and validity area. Both these validity parameters may be specified or configured by the network, e.g., using RRC signaling. Here, the UE 205 starts the validity timer when it first acquires a particular version of V2X communication resource. The validity area is a certain geographical area, e.g., defined as a collection of cells or tracking areas. The network may implicitly or explicitly indicate if the said validity area is just the serving cell where the V2X resources are received or rather a collection of cells or tracking areas.

Figure 6:
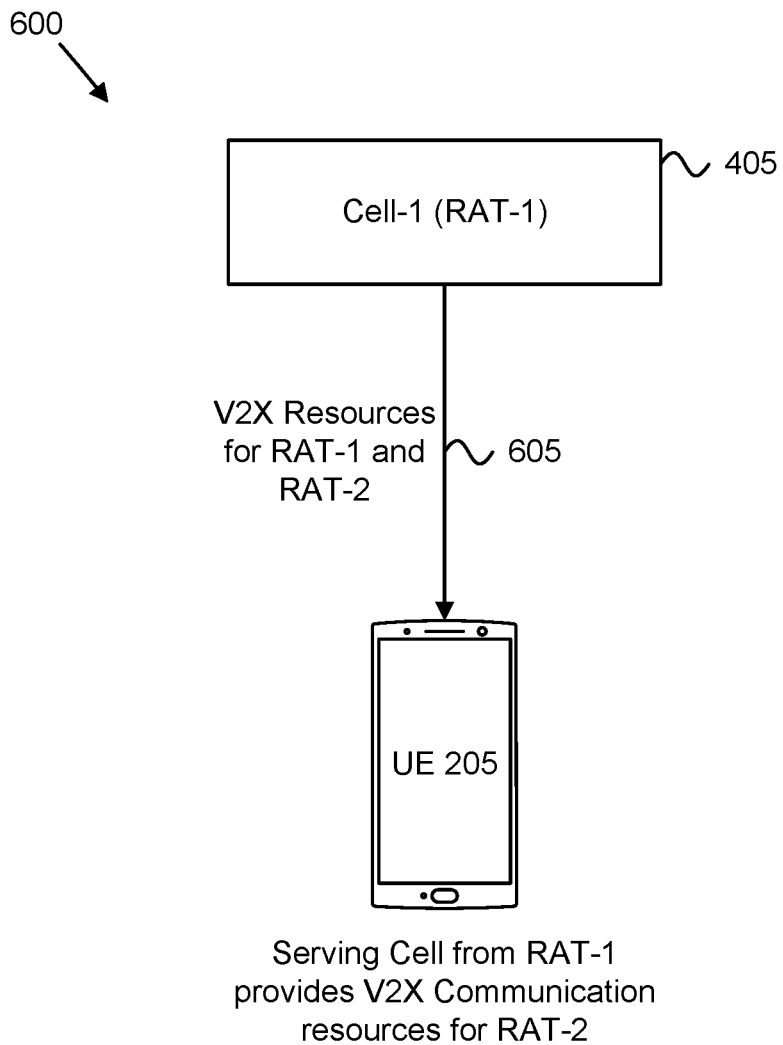
FIG. 6 is a diagram illustrating one embodiment of a serving cell providing V2X communication resources to a UE.

FIG. 6 depicts a fifth scenario 600 of V2X mobility handling, according to embodiments of the disclosure. While in a serving cell, such as Cell-1/RAT-1 405, the V2X UE 205 receives V2X communication resources for RAT-1 and RAT-2 (see 605). As discussed above, the UE 205 may store the V2X communication resources. Here, the serving cell may indicate Exceptional resource pools for each RAT.

According to the sixth solution, a V2X UE 205 uses common (or separate) Exceptional resource Pool(s) ("e-Pool") for both Network Scheduled mode ("NS Mode") and UE Autonomous mode for RAT-2 once the mobility event kicks in. As used herein, NS Mode of V2X communication refers to a centralized scheduling mode where the network determines resource allocation for V2X communications, i.e., Mode-1 in NR V2X and Mode-3 in LTE V2X. In contrast, UE autonomous selection of V2X communication resource refers to a distributed scheduling mode where the UE 205 determines resource allocation without explicit signaling from the network, i.e., Mode-2 in NR V2X and Mode-4 in LTE V2X. Note that UE autonomous selection may or may not be based on resource Sensing operation According to some embodiments, a mobility event is described as the instant in time when one of timers (T300, T301, T304, T310, T319 etc.) described in TS 38.331-f40 or their equivalent timers in TS 36.331-f40 is started in the UE. Generally, these timers mark the handover start, radio link failure, start of the transition to RRC connected or to RRC Idle, etc. The time duration between the timer start and its stop/release is a transient time during which the V2X UE may not have resources available V2X communication in either or both the RATs. For transitioning from one of the RRC states to another RRC state, the transition may not be bound by a specific timer all the time during the transition but the transient time still applies to such state transition and therefore the V2X communication resource received before the start of the transition from the erstwhile Serving cell is still used until the end of the transition period. For example, a RRC Connected UE takes a finite time when leaving RRC Connected State and until it finds a suitable cell to camp on in RRC Idle. In some cases, the UE may not at all find any suitable cell to camp on, e.g., when the UE meets RLF and the timer T310 and timer T311 runs out and the UE eventually finds itself in Out of Coverage. Until any such transition, the embodiment allows the UE to use the V2X communication resource received before the start of the transition from the erstwhile Serving cell. If the upper layers deliver a V2X message that needs to be transmitted also (or only) in RAT-2, then the UE uses a common (or separate) e-Pool for NS Mode and UE autonomous mode for RAT-2 once the mobility event kicks in.

According to the sixth solution, when a mobility event occurs, for the ongoing SL communication on each RAT, the UE 205 will use "Exceptional" resources and perform UE-based autonomous resource selection. In certain embodiments, UE-based autonomous resource selection includes Sensing operation. The "Exceptional" resources may be separate for NS Mode based V2X communication and UE autonomous resource selection mode based V2X communication. Alternatively, the 'Exceptional" resources may be common resource Pool(s) irrespective of the previous used V2X communication mode. The said exceptional resources for each RAT may be provided to the UE by the serving cell using RRC signaling (as depicted in FIG. 6) or, alternatively, may be obtained by the UE in another way, for example a pre-configured resource, a specified resource, and/or a previously stored resource.

According to the seventh solution, the V2X UE 205 senses free resource pools for the serving RAT and/or non-serving RAT when a mobility event occurs on the serving RAT. Here, the free resource Pool(s) are used for re-transmissions as well as for new transmissions, once the mobility event kicks in. For re-transmissions, the transmitting UE 205 ("Tx UE") continues to use the same source L2 ID and HARQ process ID (or equivalently any identification of the initial grant in question) as used in the initial transmission before the mobility event. A receiving UE 205 ("Rx UE") uses the source L2 ID and HARQ process ID for soft combining in a particular HARQ buffer. This is also applicable if the mobility event leads to a switch from Mode-1 transmission to Mode-2 re-transmissions like in an exceptional pool, described below.

If re-transmissions are scheduled for a PDU transmitted before the mobility event, the re-transmission resources are selected without waiting for the completion of sensing operation, e.g., using random resource selection in the whole exceptional resource pool (referred to as "e-pool"), or in a part of it or in a different exceptional pool defined only for this purpose (referred to as "e-pool_2").

Such (pre)configured or specified e-pool_2 is to be used also in the first few milliseconds for data (re)transmissions, i.e., until the sensing results become available. Regarding the acquisition of exceptional Pool (including e-pool_2), exceptional resources may have been configured by the source cell (e.g., using dedicated or broadcast signaling) for each RAT and/or the remote unit 105 may have acquired such "valid" resources in the current RAN Validity Area from previous serving cell(s) using RRC signaling for each RAT as described in further detail below with reference to FIG. 3.

As discussed above, according to the eighth solution the exceptional resources may be defined to be the "pre-configured frequency and/or resource Pool" for each RAT.

Figure 7:
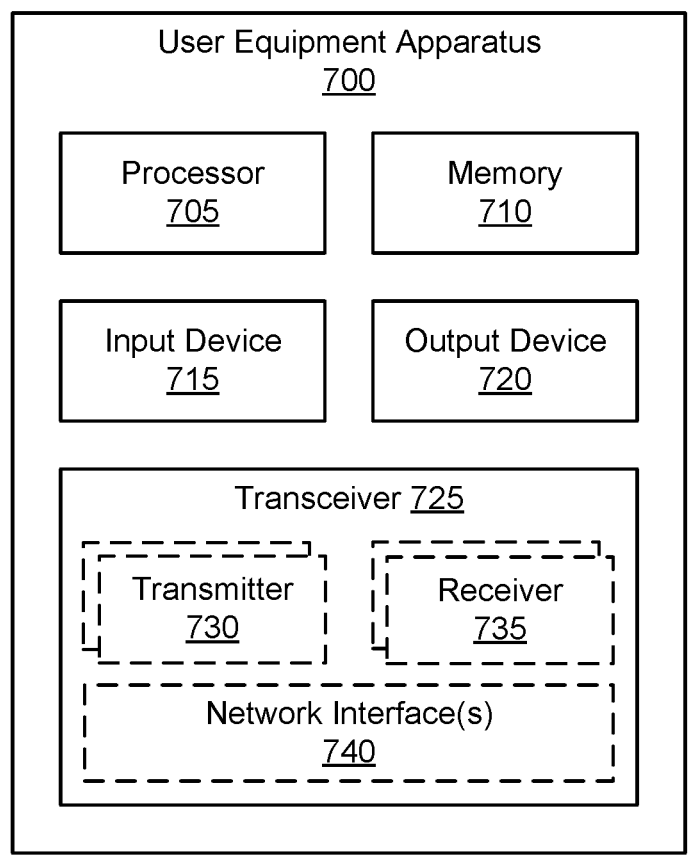
FIG. 7 is a diagram illustrating one embodiment of a user equipment apparatus that may be used for efficient mobility handling during V2X communication.

FIG. 7 depicts a user equipment apparatus 700 that may be used for efficient mobility handling during V2X communication, according to embodiments of the disclosure. In various embodiments, the user equipment apparatus 700 is used to implement one or more of the solutions described above. The user equipment apparatus 700 may be one embodiment of the AMF, described above. Furthermore, the user equipment apparatus 700 may include a processor 705, a memory 710, an input device 715, an output device 720, and a transceiver 725. In some embodiments, the input device 715 and the output device 720 are combined into a single device, such as a touchscreen. In certain embodiments, the user equipment apparatus 700 may not include any input device 715 and/or output device 720. In various embodiments, the user equipment apparatus 700 may include one or more of: the processor 705, the memory 710, and the transceiver 725, and may not include the input device 715 and/or the output device 720.

The processor 705, in one embodiment, may include any known controller capable of executing computer-readable instructions and/or capable of performing logical operations. For example, the processor 705 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 705 executes instructions stored in the memory 710 to perform the methods and routines described herein. The processor 705 is communicatively coupled to the memory 710, the input device 715, the output device 720, and the transceiver 725.

In various embodiments, the processor 705 controls the user equipment apparatus 700 to implement the above described UE behaviors. In some embodiments, the transceiver 725 communicates using a first V2X resource while in a first serving cell having a first RAT. The processor 705 detects a mobility event of the first cell and switches to a second cell in response to the mobility event, the second cell being different than the first cell. The processor 705 communicates using the first V2X resource on the second cell until a trigger condition occurs and switches to a second V2X resource in response to occurrence of the trigger condition.

In some embodiments, the trigger condition comprises receiving RRC signaling from the second cell, wherein the RRC signaling indicates the second V2X resource. In some embodiments, the trigger condition comprises one of: re-stablishing an RRC connection in the second cell, completing handover to the second cell, transitioning to an RRC Idle state, and successfully transitioning to an RRC Connected state. In some embodiments, the trigger condition comprises one of: expiration of a fallback timer and determining an out-of-coverage state.

In some embodiments, the trigger condition and/or the second V2X resource is configured by the first cell. In some embodiments, the second V2X resource is configured by the second cell. In such embodiments, the UE may receive new V2X resource information, e.g., via dedicated signaling, after completing handover to the second cell, wherein the processor 705 overwrites previously stored V2X resource information.

In some embodiments, the second V2X resource is a preconfigured resource for distributed scheduling mode V2X communications. Examples of a distributed (i.e., UE autonomous) scheduling mode include NR V2X Mode-2 and LTE V2X Mode-4. In some embodiments, the second V2X resource is selected from a pool of exceptional resources. In such embodiments, the pool of exceptional resources may be common to both centralized scheduling mode V2X communications and distributed scheduling mode V2X communications. Examples of a centralized (i.e., network-scheduled) scheduling mode include NR V2X Mode-1 and LTE V2X Mode-3.

In some embodiments, the processor 705 receives authorization to perform V2X communication in the second cell while in the coverage of the first cell. In some embodiments, the processor 705 receives authorization to read and use a resource pool for distributed scheduling mode V2X communications, said authorization received from a neighboring cell having the second cell.

In some embodiments, the mobility event comprises one of: a handover to a target cell, cell reselection, radio link failure, transitioning an RRC state, and RRC connection re-establishment.

The memory 710, in one embodiment, is a computer readable storage medium. In some embodiments, the memory 710 includes volatile computer storage media. For example, the memory 710 may include a RAM, including dynamic RAM ("DRAM"), synchronous dynamic RAM ("SDRAM"), and/or static RAM ("SRAM"). In some embodiments, the memory 710 includes non-volatile computer storage media. For example, the memory 710 may include a hard disk drive, a flash memory, or any other suitable non-volatile computer storage device. In some embodiments, the memory 710 includes both volatile and non-volatile computer storage media.

In some embodiments, the memory 710 stores data related to efficient mobility handling during V2X communication. For example, the memory 710 may store V2X communication resources, exceptional resource pools, UE configurations, and the like. In certain embodiments, the memory 710 also stores program code and related data, such as an operating system or other controller algorithms operating on the user equipment apparatus 700.

The input device 715, in one embodiment, may include any known computer input device including a touch panel, a button, a keyboard, a stylus, a microphone, or the like. In some embodiments, the input device 715 may be integrated with the output device 720, for example, as a touchscreen or similar touch-sensitive display. In some embodiments, the input device 715 includes a touchscreen such that text may be input using a virtual keyboard displayed on the touchscreen and/or by handwriting on the touchscreen. In some embodiments, the input device 715 includes two or more different devices, such as a keyboard and a touch panel.

The output device 720, in one embodiment, is designed to output visual, audible, and/or haptic signals. In some embodiments, the output device 720 includes an electronically controllable display or display device capable of outputting visual data to a user. For example, the output device 720 may include, but is not limited to, an LCD display, an LED display, an OLED display, a projector, or similar display device capable of outputting images, text, or the like to a user. As another, non-limiting, example, the output device 720 may include a wearable display separate from, but communicatively coupled to, the rest of the user equipment apparatus 700, such as a smart watch, smart glasses, a heads-up display, or the like. Further, the output device 720 may be a component of a smart phone, a personal digital assistant, a television, a table computer, a notebook (laptop) computer, a personal computer, a vehicle dashboard, or the like.

In certain embodiments, the output device 720 includes one or more speakers for producing sound. For example, the output device 720 may produce an audible alert or notification (e.g., a beep or chime). In some embodiments, the output device 720 includes one or more haptic devices for producing vibrations, motion, or other haptic feedback. In some embodiments, all or portions of the output device 720 may be integrated with the input device 715. For example, the input device 715 and output device 720 may form a touchscreen or similar touch-sensitive display. In other embodiments, the output device 720 may be located near the input device 715.

As discussed above, the transceiver 725 communicates with one or more network functions of a mobile communication network via one or more access networks. The transceiver 725 operates under the control of the processor 705 to transmit messages, data, and other signals and also to receive messages, data, and other signals. For example, the processor 705 may selectively activate the transceiver 725 (or portions thereof) at particular times in order to send and receive messages.

The transceiver 725 may include one or more transmitters 730 and one or more receivers 735. Although only one transmitter 730 and one receiver 735 are illustrated, the user equipment apparatus 700 may have any suitable number of transmitters 730 and receivers 735. Further, the transmitter(s) 730 and the receiver(s) 735 may be any suitable type of transmitters and receivers. Additionally, the transceiver 725 may support at least one network interface 740. Here, the at least one network interface 740 facilitates communication with a RAN node, such as an eNB or gNB, for example using the "Uu" interface (e.g., LTE-Uu for eNB, NR-Uu for gNB). Additionally, the at least one network interface 740 may include an interface used for communications with one or more network functions in the mobile core network, such as a UPF, an AMF, and/or a SMF.

In one embodiment, the transceiver 725 includes a first transmitter/receiver pair used to communicate with a mobile communication network over licensed radio spectrum and a second transmitter/receiver pair used to communicate with a mobile communication network over unlicensed radio spectrum. In certain embodiments, the first transmitter/receiver pair used to communicate with a mobile communication network over licensed radio spectrum and the second transmitter/receiver pair used to communicate with a mobile communication network over unlicensed radio spectrum may be combined into a single transceiver unit, for example a single chip performing functions for use with both licensed and unlicensed radio spectrum. In some embodiments, the first transmitter/receiver pair and the second transmitter/receiver pair may share one or more hardware components. For example, certain transceivers 725, transmitters 730, and receivers 735 may be implemented as physically separate components that access a shared hardware resource and/or software resource, such as for example, the network interface 740.

In various embodiments, one or more transmitters 730 and/or one or more receivers 735 may be implemented and/or integrated into a single hardware component, such as a multi-transceiver chip, a system-on-a-chip, an application-specific integrated circuit ("ASIC"), or other type of hardware component. In certain embodiments, one or more transmitters 730 and/or one or more receivers 735 may be implemented and/or integrated into a multi-chip module. In some embodiments, other components such as the network interface 740 or other hardware components/circuits may be integrated with any number of transmitters 730 and/or receivers 735 into a single chip. In such embodiment, the transmitters 730 and receivers 735 may be logically configured as a transceiver 725 that uses one more common control signals or as modular transmitters 730 and receivers 735 implemented in the same hardware chip or in a multi-chip module. In certain embodiments, the transceiver 725 may implement a 3GPP modem (e.g., for communicating via NR or LTE access networks) and a non-3GPP modem (e.g., for communicating via Wi-Fi or other non-3GPP access networks).

Figure 8:
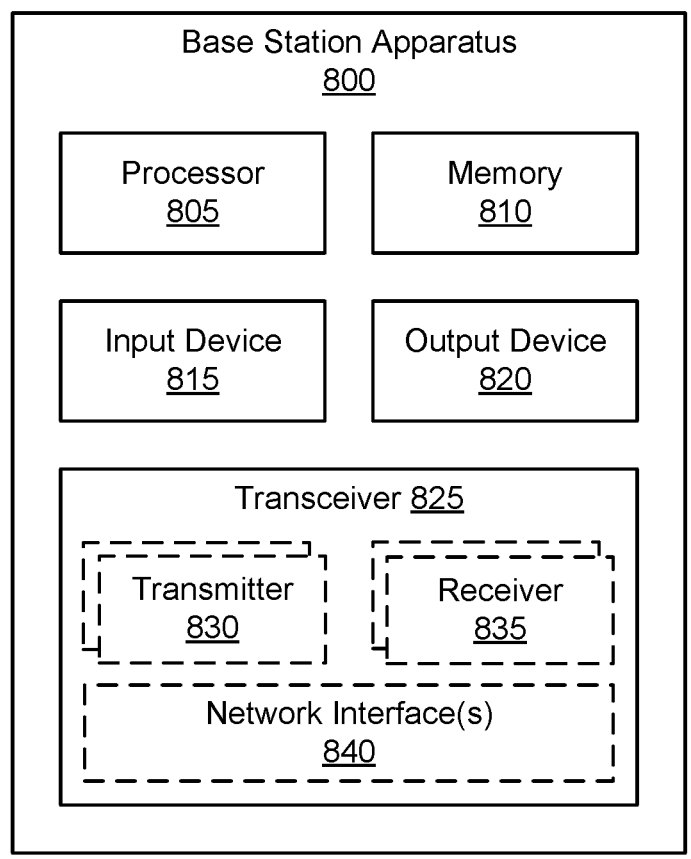
FIG. 8 is a diagram illustrating one embodiment of a user equipment apparatus that may be used for efficient mobility handling during V2X communication.

FIG. 8 depicts a base station apparatus 800 that may be used for efficient mobility handling during V2X communication, according to embodiments of the disclosure. In various embodiments, the base station apparatus 800 is used to implement one or more of the solutions described above. The base station apparatus 800 may be one embodiment of the AMF, described above. Furthermore, the base station apparatus 800 may include a processor 805, a memory 810, an input device 815, an output device 820, and a transceiver 825. In some embodiments, the input device 815 and the output device 820 are combined into a single device, such as a touchscreen. In certain embodiments, the base station apparatus 800 may not include any input device 815 and/or output device 820. In various embodiments, the base station apparatus 800 may include one or more of: the processor 805, the memory 810, and the transceiver 825, and may not include the input device 815 and/or the output device 820.

The processor 805, in one embodiment, may include any known controller capable of executing computer-readable instructions and/or capable of performing logical operations. For example, the processor 805 may be a microcontroller, a microprocessor, a CPU, a GPU, an auxiliary processing unit, a FPGA, or similar programmable controller. In some embodiments, the processor 805 executes instructions stored in the memory 810 to perform the methods and routines described herein. The processor 805 is communicatively coupled to the memory 810, the input device 815, the output device 820, and the transceiver 825.

In various embodiments, the processor 805 controls the base station apparatus 800 to implement the above described RAN node behaviors. For example, the processor 805 may control the transceiver 825 to send DCI to a UE, the DCI allocating sidelink resources for V2X communication (e.g., NR V2X mode-1 and/or LTE V2X Mode-3). In certain embodiments, the processor 805 configures the UE with a set of V2X resources, such as RAT-specific resource pools, common resource pools, exceptional resource pools, etc. In such embodiments, the processor 805 may control the transceiver to send an indication of resources. In other embodiments, the UE selects a resource from the configured set(s) of resources. In certain embodiments, the processor 805 configures the UE with fallback behavior, e.g., in the case of discontinuation of service in a particular cell.

The memory 810, in one embodiment, is a computer readable storage medium. In some embodiments, the memory 810 includes volatile computer storage media. For example, the memory 810 may include a RAM, including dynamic RAM ("DRAM"), synchronous dynamic RAM ("SDRAM"), and/or static RAM ("SRAM"). In some embodiments, the memory 810 includes non-volatile computer storage media. For example, the memory 810 may include a hard disk drive, a flash memory, or any other suitable non-volatile computer storage device. In some embodiments, the memory 810 includes both volatile and non-volatile computer storage media.

In some embodiments, the memory 810 stores data related to efficient mobility handling during V2X communication. For example, the memory 810 may store V2X communication resources, exceptional resource pools, UE configurations, and the like. In certain embodiments, the memory 810 also stores program code and related data, such as an operating system or other controller algorithms operating on the base station apparatus 800.

The input device 815, in one embodiment, may include any known computer input device including a touch panel, a button, a keyboard, a stylus, a microphone, or the like. In some embodiments, the input device 815 may be integrated with the output device 820, for example, as a touchscreen or similar touch-sensitive display. In some embodiments, the input device 815 includes a touchscreen such that text may be input using a virtual keyboard displayed on the touchscreen and/or by handwriting on the touchscreen. In some embodiments, the input device 815 includes two or more different devices, such as a keyboard and a touch panel.

The output device 820, in one embodiment, is designed to output visual, audible, and/or haptic signals. In some embodiments, the output device 820 includes an electronically controllable display or display device capable of outputting visual data to a user. For example, the output device 820 may include, but is not limited to, an LCD display, an LED display, an OLED display, a projector, or similar display device capable of outputting images, text, or the like to a user. As another, non-limiting, example, the output device 820 may include a wearable display separate from, but communicatively coupled to, the rest of the base station apparatus 800, such as a smart watch, smart glasses, a heads-up display, or the like. Further, the output device 820 may be a component of a smart phone, a personal digital assistant, a television, a table computer, a notebook (laptop) computer, a personal computer, a vehicle dashboard, or the like.

In certain embodiments, the output device 820 includes one or more speakers for producing sound. For example, the output device 820 may produce an audible alert or notification (e.g., a beep or chime). In some embodiments, the output device 820 includes one or more haptic devices for producing vibrations, motion, or other haptic feedback. In some embodiments, all or portions of the output device 820 may be integrated with the input device 815. For example, the input device 815 and output device 820 may form a touchscreen or similar touch-sensitive display. In other embodiments, the output device 820 may be located near the input device 815.

The transceiver 825 includes at least transmitter 830 and at least one receiver 835. One or more transmitters 830 may be used to send messages to the RAN, as described herein. Similarly, one or more receivers 835 may be used to receive messages from the RAN, as described herein. Although only one transmitter 830 and one receiver 835 are illustrated, the base station apparatus 800 may have any suitable number of transmitters 830 and receivers 835. Further, the transmitter(s) 825 and the receiver(s) 830 may be any suitable type of transmitters and receivers.

In various embodiments, the transceiver 825 supports one or more network interfaces 840 for communicating with a UE and/or network function. For example, the transceiver 825 may support an "Uu" interface with the UE. Additionally, the transceiver 825 may support various 5GC service interfaces, such as the N2 interface and/or N3 interface.

Figure 9:
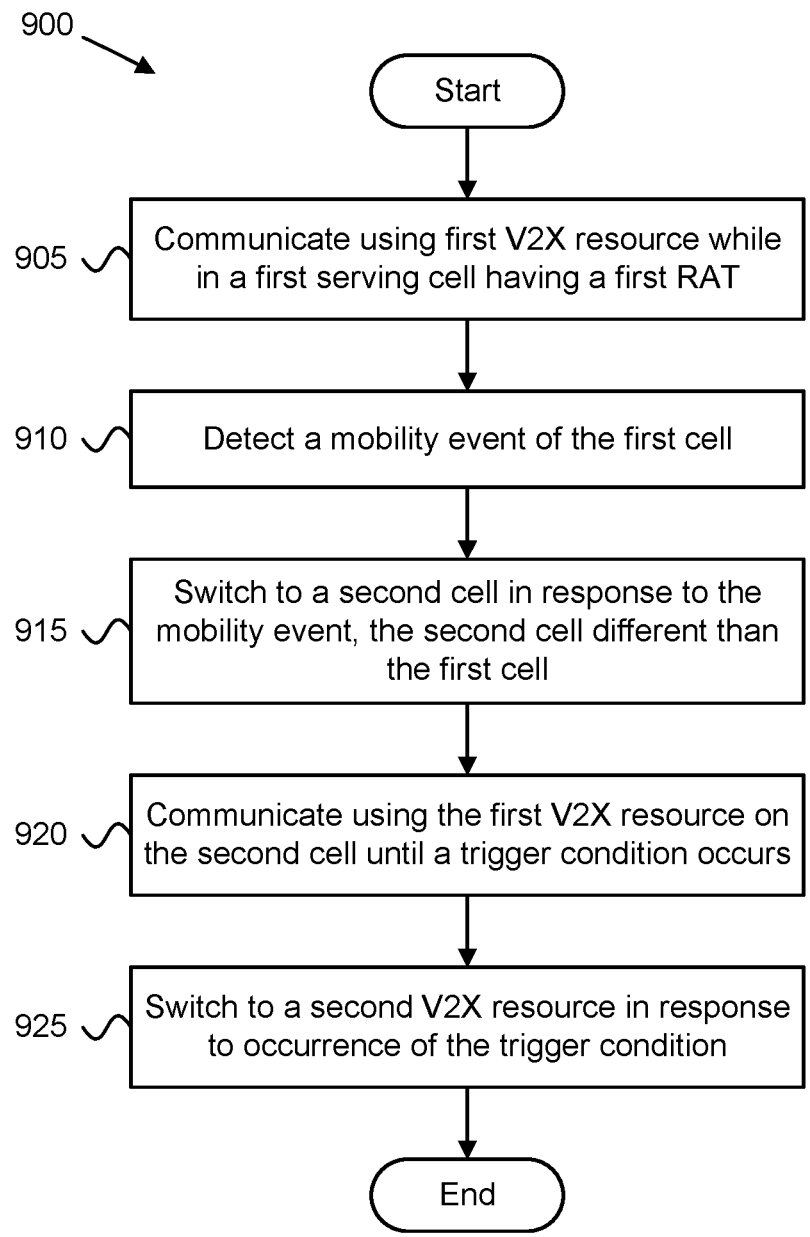
FIG. 9 is a flowchart diagram illustrating one embodiment of a method that may be used for efficient mobility handling during V2X communication.

FIG. 9 is a flowchart diagram of a method 900 for efficient mobility handling during V2X communication. The method 900 may be performed by a UE, such as the remote unit 105, the UE 205, and/or the user equipment apparatus 700. In some embodiments, the method 900 may be performed by a processor executing program code, for example, a microcontroller, a microprocessor, a CPU, a GPU, an auxiliary processing unit, a FPGA, or the like.

The method 900 begins and communicates 905 using first V2X resource while in a first serving cell having a first RAT. The method 900 includes detecting 910 a mobility event of the first cell. The method 900 includes switching 915 to a second cell in response to the mobility event, the second cell different than the first cell.

The method 900 includes communicating 920 using the first V2X resource on the second cell until a trigger condition occurs. The method 900 includes switching 925 to a second V2X resource in response to occurrence of the trigger condition. The method 900 ends.

Disclosed herein is a first apparatus for managing uplink preemption, according to embodiments of the disclosure. The first apparatus may be implemented by a UE, such as the remote unit 105, the UE 205, and/or the user equipment apparatus 700. The first apparatus includes a transceiver that communicates using a first V2X resource while in a first serving cell having a first RAT. The first apparatus includes a processor that detects a mobility event of the first cell and switches to a second cell in response to the mobility event, the second cell different than the first cell. The processor communicates using the first V2X resource on the second cell until a trigger condition occurs and switches to a second V2X resource in response to occurrence of the trigger condition.

In some embodiments, the trigger condition comprises receiving RRC signaling from the second cell, wherein the RRC signaling indicates the second V2X resource. In some embodiments, the trigger condition comprises one of: re-stablishing an RRC connection in the second cell, completing handover to the second cell, transitioning to an RRC Idle state, and successfully transitioning to an RRC Connected state. In some embodiments, the trigger condition comprises one of: expiration of a fallback timer and determining an out-of-coverage state.

In some embodiments, the trigger condition and/or the second V2X resource is configured by the first cell. In some embodiments, the second V2X resource is configured by the second cell. In such embodiments, the UE may receive new V2X resource information, e.g., via dedicated signaling, after completing handover to the second cell, wherein the processor overwrites previously stored V2X resource information.

In some embodiments, the second V2X resource is a preconfigured resource for distributed scheduling mode V2X communications. Examples of a distributed (i.e., UE autonomous) scheduling mode include NR V2X Mode-2 and LTE V2X Mode-4. In some embodiments, the second V2X resource is selected from a pool of exceptional resources. In such embodiments, the pool of exceptional resources may be common to both centralized scheduling mode V2X communications and distributed scheduling mode V2X communications. Examples of a centralized (i.e., network-scheduled) scheduling mode include NR V2X Mode-1 and LTE V2X Mode-3.

In some embodiments, the processor receives authorization to perform V2X communication in the second cell while in the coverage of the first cell. In some embodiments, the processor receives authorization to read and use a resource pool for distributed scheduling mode V2X communications, said authorization received from a neighboring cell having the second cell.

In some embodiments, the mobility event comprises one of: a handover to a target cell, cell reselection, radio link failure, transitioning an RRC state, and RRC connection re-establishment.

Disclosed herein is a first method for managing uplink preemption, according to embodiments of the disclosure. The first method may be performed by a UE, such as the remote unit 105, the UE 205, and/or the user equipment 700. The first method includes communicating using a first V2X resource while in a first serving cell having a first RAT, detecting a mobility event of the first cell and switching to a second cell in response to the mobility event, the second cell different than the first cell. The first method includes communicating using the first V2X resource on the second cell until a trigger condition occurs and switching to a second V2X resource in response to occurrence of the trigger condition.

In some embodiments, the trigger condition comprises receiving RRC signaling from the second cell, wherein the RRC signaling indicates the second V2X resource. In some embodiments, the trigger condition comprises one of: re-stablishing an RRC connection in the second cell, completing handover to the second cell, transitioning to an RRC Idle state, and successfully transitioning to an RRC Connected state. In some embodiments, the trigger condition comprises one of: expiration of a fallback timer and determining an out-of-coverage state.

In some embodiments, the trigger condition and/or the second V2X resource is configured by the first cell. In some embodiments, the second V2X resource is configured by the second cell. In such embodiments, the UE may receive new V2X resource information, e.g., via dedicated signaling, after completing handover to the second cell, wherein the first method further comprises overwriting previously stored V2X resource information.

In some embodiments, the second V2X resource is a preconfigured resource for distributed scheduling mode V2X communications. Examples of a distributed (i.e., UE autonomous) scheduling mode include NR V2X Mode-2 and LTE V2X Mode-4. In some embodiments, the second V2X resource is selected from a pool of exceptional resources. In such embodiments, the pool of exceptional resources may be common to both centralized scheduling mode V2X communications and distributed scheduling mode V2X communications. Examples of a centralized (i.e., network-scheduled) scheduling mode include NR V2X Mode-1 and LTE V2X Mode-3.

In some embodiments, the first method includes receiving authorization to perform V2X communication in the second cell while in the coverage of the first cell. In some embodiments, the first method includes receiving authorization to read and use a resource pool for distributed scheduling mode V2X communications, said authorization received from a neighboring cell having the second cell.

In some embodiments, the mobility event comprises one of: a handover to a target cell, cell reselection, radio link failure, transitioning an RRC state, and RRC connection re-establishment.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. An apparatus comprising:
   a transceiver that communicates using a first Vehicle-to-Everything ("V2X") resource while in a first serving cell having a first Radio Access Technology ("RAT"); and
   a processor that:
   detects a mobility event of the first cell;
   switches to a second cell in response to the mobility event, the second cell different than the first cell;
   communicates using the first V2X resource on the second cell until a trigger condition occurs; and
   switches to a second V2X resource in response to occurrence of the trigger condition.

2. The apparatus of claim 1, wherein the trigger condition comprises receiving Radio Resource Control ("RRC") signaling from the second cell, wherein the RRC signaling indicates the second V2X resource.

3. The apparatus of claim 1, wherein the trigger condition comprises one of: re-stablishing a Radio Resource Control ("RRC") connection in the second cell, completing handover to the second cell, transitioning to a RRC Idle state and successfully transitioning to a RRC Connected state.

4. The apparatus of claim 1, wherein the trigger condition comprises one of: expiration of a fallback timer and determining an out-of-coverage state.

5. The apparatus of claim 1, wherein the second V2X resource is a preconfigured resource for distributed scheduling mode V2X communications.

6. The apparatus of claim 1, wherein the second V2X resource is selected from a pool of exceptional resources.

7. The apparatus of claim 6, wherein the pool of exceptional resources is common to both centralized scheduling mode V2X communications and distributed scheduling mode V2X communications.

8. The apparatus of claim 1, wherein the trigger condition and/or the second V2X resource is configured by the first cell.

9. The apparatus of claim 1, wherein the second V2X resource is configured by the second cell.

10. The apparatus of claim 9, wherein the processor receives new V2X resource information dedicatedly after completing handover to the second cell, wherein the processor overwrites previously stored V2X resource information.

11. The apparatus of claim 1, wherein the processor receives authorization to perform V2X communication in the second cell while in the coverage of the first cell.

12. The apparatus of claim 1, wherein the processor receives authorization to read and use a resource pool for distributed scheduling mode V2X communications, said authorization received from a neighboring cell having the second cell.

13. The apparatus of claim 1, wherein the mobility event comprises one of: a handover to a target cell, cell reselection, radio link failure, transitioning a Radio Resource Control ("RRC") state, and RRC connection re-establishment.

14. A method of a user equipment device ("UE") comprising:
   communicating using a first Vehicle-to-Everything ("V2X") resource while in a first serving cell having a first Radio Access Technology ("RAT");
   detecting a mobility event of the first cell;
   switching to a second cell in response to the mobility event, the second cell different than the first cell;
   communicating using the first V2X resource on the second cell until a trigger condition occurs; and
   switching to a second V2X resource in response to occurrence of the trigger condition.

15. The method of claim 14, wherein the trigger condition comprises receiving Radio Resource Control ("RRC") signaling from the second cell, wherein the RRC signaling indicates the second V2X resource.

16. The method of claim 14, wherein the trigger condition comprises one of: re-stablishing a Radio Resource Control ("RRC") connection in the second cell, completing handover to the second cell, transitioning to a RRC Idle state and successfully transitioning to a RRC Connected state.

17. The method of claim 14, wherein the trigger condition comprises one of: expiration of a fallback timer and determining an out-of-coverage state.

18. The method of claim 14, wherein the trigger condition and/or the second V2X resource is configured by the first cell.

19. The method of claim 14, further comprising receiving authorization to perform V2X communication in the second cell while in the coverage of the first cell.

20. The method of claim 14, further comprising receiving authorization to read and use a resource pool for distributed scheduling mode V2X communications, said authorization received from a neighboring cell having the second cell.

* * * * *